Patented Mar. 13, 1928.

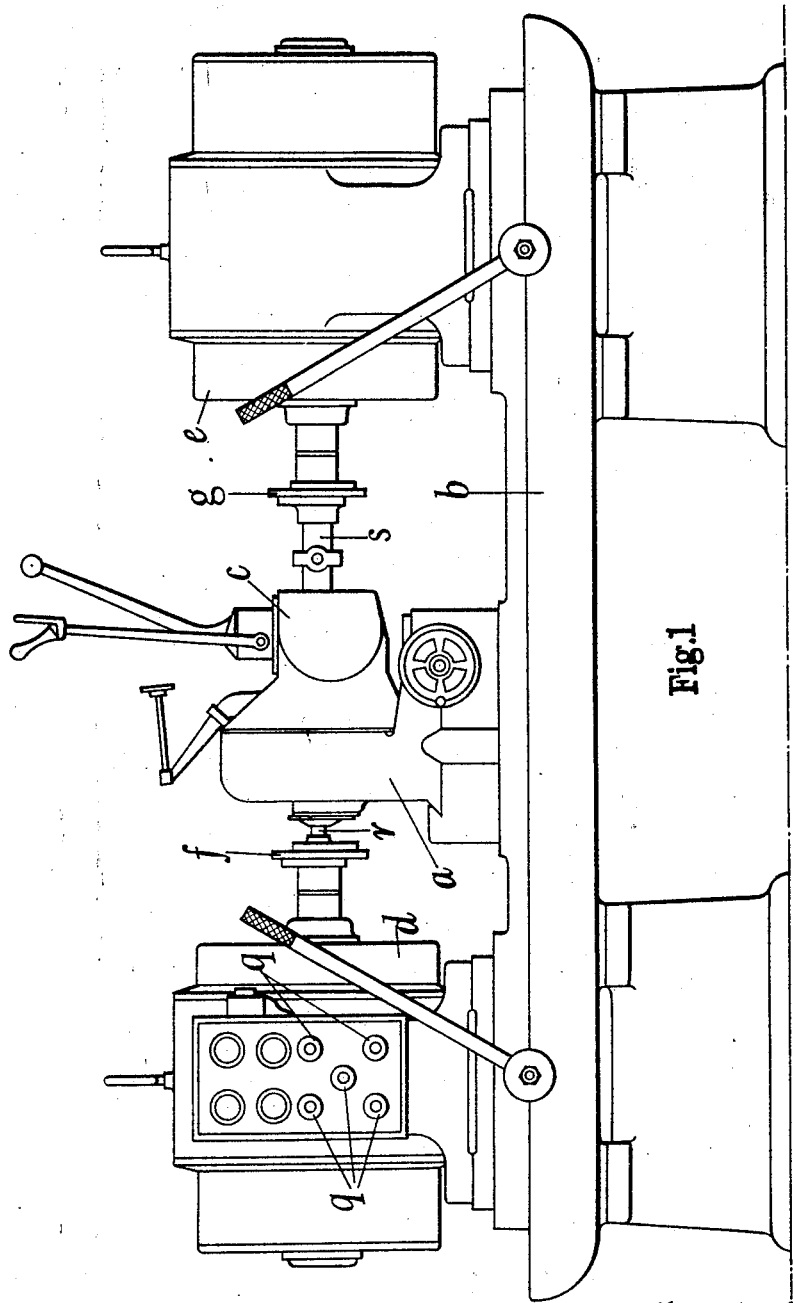

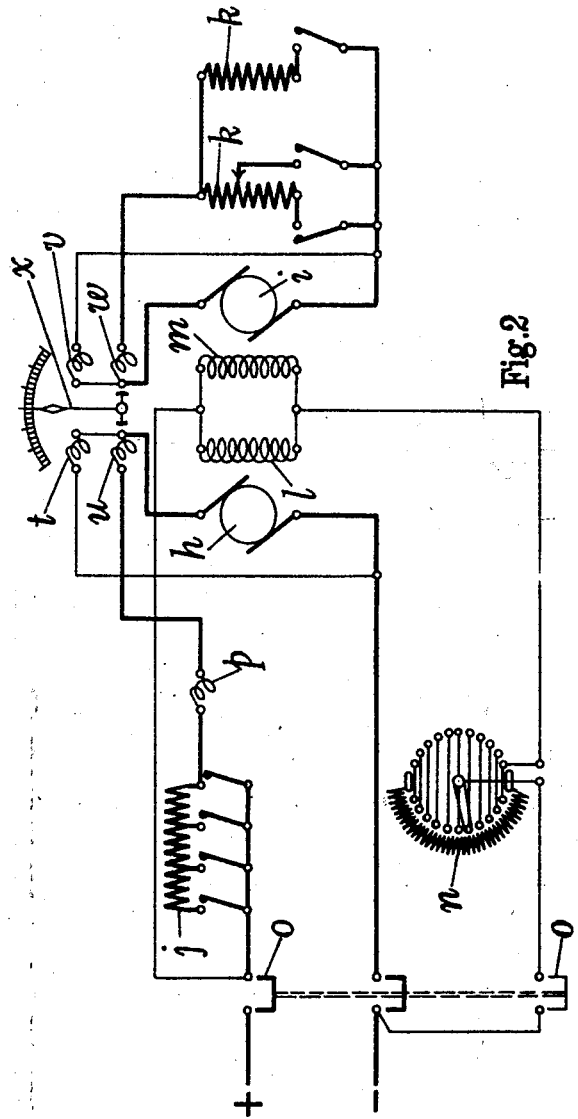

1,662,705

UNITED STATES PATENT OFFICE.

FRANK WILLIAM HIGHFIELD, OF COVENTRY, ENGLAND.

ELECTRICAL APPARATUS FOR TESTING MOTOR VEHICLE AND OTHER MECHANICAL POWER-TRANSMISSION MECHANISMS.

Application filed May 23, 1927, Serial No. 193,687, and in Great Britain July 21, 1926.

This invention relates primarily to the testing of transmission mechanisms for motor vehicles, but is applicable to the testing of various forms of mechanical power transmission mechanisms.

The object of the invention is to provide a simple and convenient electrical apparatus whereby the mechanism can be rotated at any desired speed under any desired load, and also to provide means for indicating the efficiency of the mechanism.

The invention comprises the employment of an electric motor and an electric generator between which the mechanisms to be tested can be mounted, together with means for varying the speed and load.

Also the invention comprises the interconnection of the shunt field windings of the motor and generator, and the use of a regulator which is common to the said windings.

Further the invention comprises a double action wattmeter connected to both the motor and the generator and adapted to indicate the efficiency of the mechanisms under test.

In the accompanying sheet of explanatory drawings:—

Figure 1 is a diagrammatic side elevation illustrating a machine constructed in accordance with this invention for testing the gear boxes of motor vehicles.

Figure 2 is a diagram of the electrical arrangement of the machine.

In one construction of an apparatus as illustrated for testing the change speed gears of motor vehicles, I employ a headstock $a$ which is transversely slidable on a suitable horizontal bed $b$ and is adapted for the attachment thereto of the box or case $c$ containing the gears to be tested. The headstock is provided with a short shaft $r$ adapted to be connected to the driving shaft of the gears, and preferably the headstock shaft has mounted on it a flywheel which is contained within the interior of the headstock.

On the same bed as the headstock, and on opposite sides of the latter are mounted the driving motor $d$ and the loading generator $e$ respectively. These are slidably carried on the bed so that they can readily be connected to and disconnected from the driving shaft of the headstock and the driven shaft $s$ of the gears respectively the connection being effected by couplings $f$, $g$.

Referring to the electrical diagram at Figure 2, the armature of the motor is indicated by $h$ and that of the generator by $i$. In series with the armature $h$ are a number of controlling resistances $j$. The circuit of the armature $i$ is provided with, for example, a series-parallel arrangement of controlling resistances $k$. If preferred any other device may be employed for loading the generator. The shunt field windings of the two machines are indicated by $l$, $m$, respectively, and are connected together as shown. Control of the field windings is effected by a rheostat $n$ which may be actuated by an electric motor (not shown). The current supply to the armature $h$ and the field windings $l, m$, is controlled by a switch $o$. The circuit of the armature $h$ may also contain an overload relay $p$ which serves to open the switch $o$ or any other switch automatically through any convenient intermediate device (not shown) in the event of an overload.

Preferably the various resistances in the armature circuits, and the motor for actuating the field rheostat, are controlled by relay devices actuated by push buttons $q$ arranged on a panel which may be carried on the motor, the said resistances being themselves arranged at a convenient distance from the testing apparatus in a separate cubicle or container.

For indicating the efficiency of the apparatus, I employ a double action wattmeter. The instrument contains two pairs of coils. One pair comprises a voltage coil $t$ arranged in shunt with the motor armature and a current coil $u$ in series with the armature. The other pair consists of a voltage coil $v$ and a current coil $w$ likewise connected to the generator armature. The two pairs of coils act on a common indicating device $x$ in such a manner as to indicate the difference of power of the two machines and hence give a measure of the efficiency of the transmission mechanism.

In one form of my apparatus, I arrange the various regulators to permit four different tests being carried out under the control of four push buttons, a fifth button serving to stop the apparatus. Depression of the first button causes the mechanism to be run at any speed (say 500 R. P. M.) with no load. By means of the second and third buttons, the mechanism can be accelerated from say 500 R. P. M. to a speed of 2000 R. P. M. in a period of 30 seconds, maintained at that speed for say 10 seconds, and finally decelerated to 500 R. P. M. in 30 seconds, this operation being performed on any of the gear combinations of the mechanism. Depression of the fourth button causes the mechanism to be accelerated from say 500 R. P. M. to 1000 R. P. M. and run continuously on any gear combination, with full load.

The invention is not limited to the example above described as the details may be suitably modified to meet different requirements.

Having thus described my invention what I claim as new and desire to secure by Letters Patent is:—

1. In apparatus for testing motor vehicle and other mechanical power transmission mechanisms, the combination comprising an electric motor, an electric generator, means whereby the mechanism to be tested can be mounted detachably between the motor and generator, interconnected shunt field windings in the motor and generator, and a regulator which is common to the said windings, substantially as described.

2. In apparatus for testing motor vehicle and other mechanical power transmission mechanisms, the combination comprising an electric motor, an electric generator, means whereby the mechanism to be tested can be mounted detachably between the motor and generator, and a double-action wattmeter connected to both the motor and the generator and adapted to indicate the efficiency of the mechanism under test, substantially as described.

3. In apparatus for testing motor vehicle and other mechanical power transmission mechanisms, the combination comprising an electric motor, an electric generator, means whereby the mechanism to be tested can be mounted detachably between the motor and generator, and a double-action wattmeter comprising a pair of coils connected to the motor, a pair of coils connected to the generator, and a movable coil with index under the influence of the fields due to the two pairs of coils, substantially as described.

4. In apparatus for testing motor vehicle and other mechanical power transmission mechanisms, the combination comprising a horizontal bed, an electric motor slidably mounted at one end of the bed, an electric generator slidably mounted at the opposite end of the bed, means on the bed for supporting and securing the mechanism to be tested between the motor and generator, and means for detachably connecting the said mechanism to the shafts of the motor and generator, substantially as described.

In testimony whereof I have signed my name to this specification.

FRANK WILLIAM HIGHFIELD.